(12) United States Patent  (10) Patent No.: US 8,401,254 B2
Yoshio  (45) Date of Patent: Mar. 19, 2013

(54) IMAGE SEARCH DEVICE AND IMAGE SEARCH METHOD (75) Inventor: Hiroaki Yoshio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/254,590

(22) PCT Filed: Sep. 4, 2009

(86) PCT No.: PCT/JP2009/004401
§ 371 (c)(1),
(2), (4) Date: Sep. 2, 2011

(87) PCT Pub. No.: WO2010/100687
PCT Pub. Date: Sep. 10, 2010

(65) Prior Publication Data
US 2011/0320463 A1 Dec. 29, 2011

(30) Foreign Application Priority Data
Mar. 6, 2009 (JP) ................ P2009053440

(51) Int. Cl.
G06F 17/30 (2006.01)
(52) U.S. Cl. ...................... 382/118; 382/284
(58) Field of Classification Search .......... 382/118, 382/284
See application file for complete search history.

(56) References Cited

U.S. PATENT DOCUMENTS 5,850,463 A * 12/1998 Horii .......................... 382/118
6,292,593 B1 * 9/2001 Nako et al. ................. 382/284
6,529,630 B1 * 3/2003 Kinjo ......................... 382/190
6,990,255 B2 * 1/2006 Romanik et al. ........... 382/284
7,379,568 B2 * 5/2008 Movellan et al. .......... 382/118
7,403,643 B2 * 7/2008 Ianculescu et al. ........ 382/118
7,418,116 B2 * 8/2008 Fedorovskaya et al. ... 382/118
7,440,586 B2 * 10/2008 Avidan ....................... 382/103
7,444,007 B2 * 10/2008 Schonberg et al. ........ 382/117

(Continued)

FOREIGN PATENT DOCUMENTS

JP   02-186484 A   7/1990
JP   2002-183205 A   6/2002

(Continued)

OTHER PUBLICATIONS

International Search Report for PCT/JP2009/004401 dated Nov. 17, 2009.

Primary Examiner — Kim Nguyen
(74) Attorney, Agent, or Firm — Pearne & Gordon LLP (57) ABSTRACT An object of the present invention is to provide an image search device and an image search method by which search efficiency is improved. The image search device includes a personal characteristic database (21) where images of individual multiple photographic subjects obtained by shooting by multiple cameras (10) are stored in the form of a database, a similarity search unit (22) that performs a similarity search by using a query image from the images of the individual multiple photographic subjects stored in the personal characteristic database (21), a query image generation unit (23) that generates a new query image by synthesizing, of the multiple images obtained by the similarity search unit (22), a correct image used as a criteria with another correct image or synthesizing the correct image used as the criteria with a negative-positive inverted incorrect image, and an image processing unit (24) that performs image processing for displaying the images retrieved by the similarity search unit (22) on a search terminal (30).

10 Claims, 9 Drawing Sheets

U.S. PATENT DOCUMENTS

| | | | |
|---|---|---|---|
| 7,457,432 B2 * | 11/2008 | Ai et al. | 382/103 |
| 2008/0144891 A1 * | 6/2008 | Hwang et al. | 382/118 |
| 2008/0273743 A1 * | 11/2008 | Woodard et al. | 382/100 |
| 2009/0003709 A1 | 1/2009 | Kaneda et al. | |

FOREIGN PATENT DOCUMENTS

| | | |
|---|---|---|
| JP | 2003-281157 A | 10/2003 |
| JP | 2009-015372 A | 1/2009 |

* cited by examiner

RESULTS OF FIRST SEARCH

DIFFERENCE IN CAMERA POSITION

DIFFERENCE IN LIGHTING

DIFFERENCE IN ANGLE OF VIEW

DIFFERENCE IN SHOOTING IMAGE QUALITY

IMAGE SEARCH DEVICE AND IMAGE SEARCH METHOD

TECHNICAL FIELD

The present invention relates to an image search device and image search method using a person search system for searching for a specific person on multiple images obtained by shooting by cameras.

BACKGROUND ART

As typical image search methods for searching for a specific person on multiple images obtained by shooting by cameras, the methods disclosed in Patent Document 1 and Patent Document 2 are known. In the method disclosed in Patent Document 1, the face/color characteristics extracted from the images obtained by shooting by cameras are stored in the form of a database and multiple top-ranked persons among persons who match specified criteria are displayed in the order of similarity. In the method disclosed in Patent Document 2, when no desired person is obtained, search is performed again after the facial expression, the age, the sex and the like are changed on the search screen.

Prior Art Documents

Patent Documents

Patent Document 1: JP-A-2002-183205
Patent Document 2: JP-A-2003-281157

SUMMARY OF THE INVENTION

Problem to be Solved by the Invention

However, there is a problem in that even for the same person, if shooting conditions such as the angle of view, the illuminance and the orientation are different, variability occurs on a personal characteristic space (details will be described below), there are cases where the search query (e.g. a face image) produces no hits for the person to be searched for, and search efficiency is poor.

The personal characteristic space will be described. Personal characteristic data extracted from images obtained by shooting by cameras is image data of a moving object that is cut out from images, or information to identify the moving object based on the shape, the color, the size, the movement and the like, or information to identify the shapes, the positions and the like of the face, the eyes, the nose and the mouth. The method of extracting and classifying these pieces of characteristic information is widely known; for example, it is exactly described in "Process and Recognition of Image" (by Takeshi Agui and Tomoharu Nagao, Shokodo Co., Ltd.). The personal characteristic data such as the face, the clothes color and the like generated by using these existing technologies is constituted by multiple elements (called dimensions) to identify a person; for example, the facial characteristic data is constituted by the total of elements for grasping the entire facial expression and elements for grasping the shapes of specific parts such as the eyes, the nose and the mouth: several hundreds to several thousands of dimensions.

Figure 12:
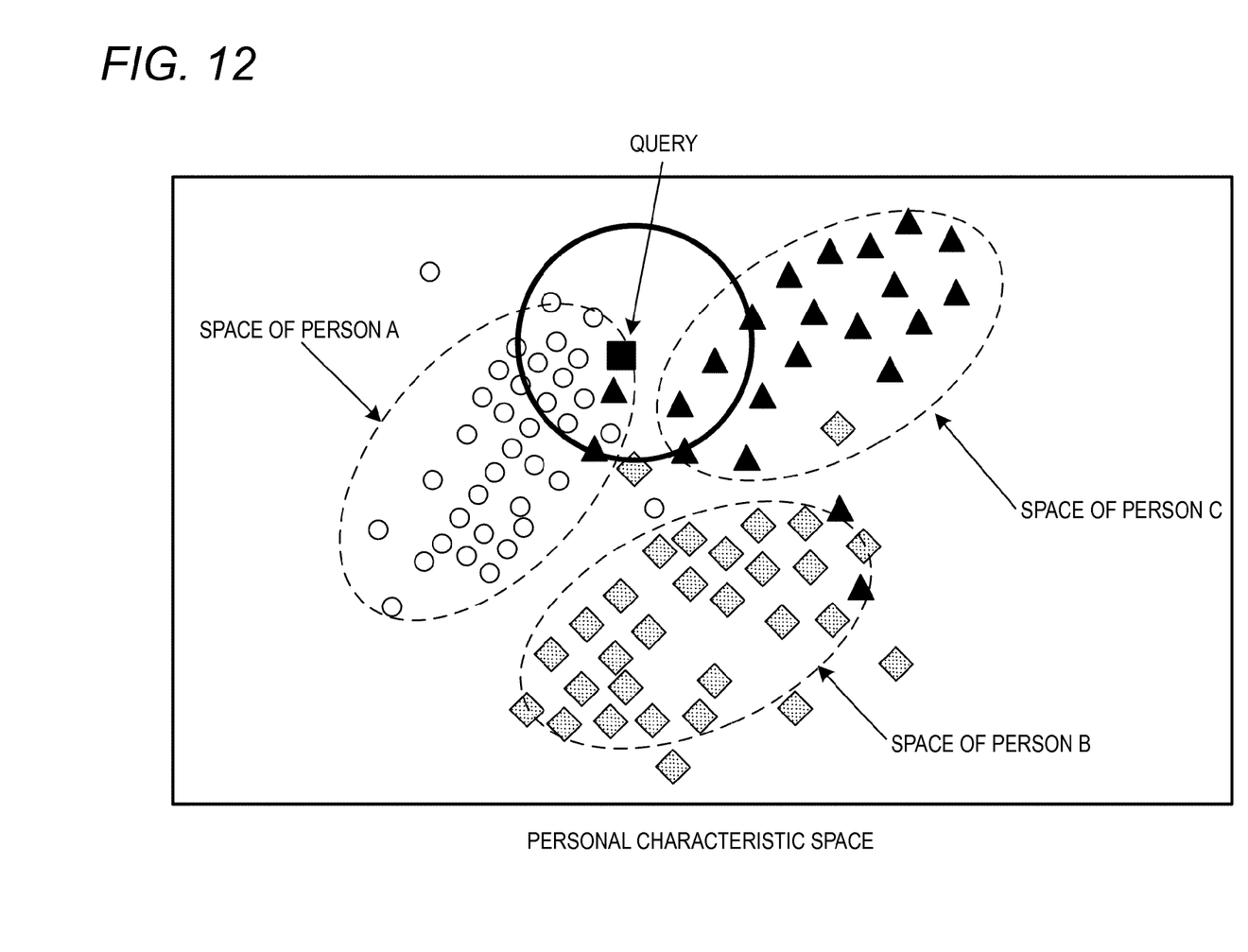
FIG. 12 is a view for explaining the personal characteristic space.

A multidimensional vector as which such personal characteristic data constituted by several hundreds to several thousands of dimensions is plotted on a space is herein called a personal characteristic space, and data of the same person tends to gather on the same space. However, since "variability" occurs on the characteristic space when shooting conditions such as the angle of view, the illuminance and the orientation are different, for example, a phenomenon occurs in which as shown in FIG. 12, persons A, B and C appear on multiple cameras and after the characteristic data of each of the persons A to C is plotted on the personal characteristic space, even though an action history search is performed by using a face photograph (query) of the person A taken by a digital camera or the like, only hits of results of the person C are produced. For this reason, the user has to perform a search operation while accepting erroneous searches, and efficiency is very poor; in addition, although the above-mentioned phenomenon can be avoided if the query can be plotted in the center of the "space of the person A", there has been no method of moving the query to the center of the "space of the person A".

The present invention is made in view of such circumstances, and an object thereof is to provide an image search device and an image search method by which search efficiency is improved.

Means for Solving the Problem

An image search device of the present invention includes: a storage unit configured to store an image of a photographic subject obtained by an imaging unit, in a form adapted to a database; a similarity search unit that performs a similarity search on the image of the photographic subject stored in the storage unit by using a query image; and a query image generation unit that generates a new query image by synthesizing a correct image used as a criteria with another correct image or synthesizing the correct image used as the criteria with a negative-positive inverted incorrect image, of a result of the search by the similarly search unit, wherein the similarity search unit performs the similarity search by using the new query image generated by the query image generation unit.

In the above configuration, the query image generation unit performs weighting according to attached information regarding the photographic subject at a time of shooting when synthesizing the correct image used as the criteria with another correct image or synthesizing the correct image used as the criteria with the negative-positive inverted incorrect image.

An image search device of the present invention includes: a storage unit configured to store, in a form adapted to a database, a characteristic amount obtained by converting an image of a photographic subject obtained by an imaging unit into an image of another dimension; a similarity search unit that performs a similarity search on the characteristic amount of the photographic subject stored in the storage unit by using a query image characteristic; and a query image generation unit that generates a new query image characteristic by synthesizing a characteristic amount obtained by converting a correct image used as a criteria into an image of another dimension with a characteristic amount obtained by converting another correct image into an image of another dimension, or synthesizing the characteristic amount obtained by converting the correct image used as the criteria into the image of another dimension with a characteristic amount obtained by converting a negative-positive inverted incorrect image into an image of another dimension, of a result of the search by the similarity search unit, wherein the similarity search unit performs the similarity search by using the new query image characteristic generated by the query image generation unit.

In the above configuration, the query image generation unit performs weighting according to attached information regarding the photographic subject at a time of shooting when synthesizing the characteristic amount obtained by converting the correct image used as the criteria into the image of another dimension with the characteristic amount obtained by converting another correct image into the image of another dimension or synthesizing the characteristic amount obtained by converting the correct image used as the criteria into the image of another dimension with the characteristic amount obtained by converting the negative-positive inverted incorrect image into the image of another dimension.

In the above configuration, the attached information regarding the photographic subject at the time of shooting includes at least one piece of the following information: an orientation of the photographic subject; an amount of change of lighting on the photographic subject; a resolution of the photographic subject; and an amount of data of the photographic subject.

An image search method of the present invention includes: a storage step of storing an image of a photographic subject obtained by an imaging unit, in a form adapted to a database; a similarity search step of performing a similarity search on the image of the photographic subject stored at the storage step by using a query image; and a query image generation step of generating a new query image by synthesizing a correct image used as a criteria with another correct image or synthesizing the correct image used as the criteria with a negative-positive inverted incorrect image, of a result of the search at the similarly search step, wherein at the similarity search step, the similarity search is performed by using the new query image generated at the query image generation step.

In the above configuration, at the query image generation step, weighting is performed according to attached information regarding the photographic subject at a time of shooting when the correct image used as the criteria is synthesized with another correct image or the correct image used as the criteria is synthesized with the negative-positive inverted incorrect image.

In the above configuration, the attached information regarding the photographic subject at the time of shooting includes at least one piece of the following information: an orientation of the photographic subject; an amount of change of lighting on the photographic subject; a resolution of the photographic subject; and an amount of data of the photographic subject.

An image search method of the present invention includes: a storage step of storing, in a form adapted to a database, a characteristic amount obtained by converting an image of a photographic subject obtained by an imaging unit into an image of another dimension; a similarity search step of performing a similarity search on the characteristic amount of the photographic subject stored at the storage step by using a query image characteristic; and a query image generation step of generating a new query image characteristic by synthesizing a characteristic amount obtained by converting a correct image used as a criteria into an image of another dimension with a characteristic amount obtained by converting another correct image into an image of another dimension, or synthesizing the characteristic amount obtained by converting the correct image used as the criteria into the image of another dimension with a characteristic amount obtained by converting a negative-positive inverted incorrect image into an image of another dimension, of a result of the search at the similarity search step, wherein at the similarity search step, the similarity search is performed by using the new query image characteristic generated at the query image generation step.

EFFECTS OF THE INVENTION

According to the present invention, images of photographic subjects obtained by an imaging unit are stored in the form adapted to a database, a similarity search is performed by using a query image from the stored images of the photographic subjects, a new query image is generated by synthesizing, of the multiple images obtained by this search, a correct image used as a criteria with another correct image or synthesizing the correct image used as the criteria with a negative-positive inverted incorrect image, and a similarity search is performed again by using the newly generated query image, so that search efficiency improves.

BRIEF DESCRIPTION OF THE DRAWINGS

FIG. 6 (a) to FIG. 6(c) are views for explaining the second search in the image search device of FIG. 1.

MODE FOR CARRYING OUT THE INVENTION

Hereinafter, a preferred embodiment for carrying out the present invention will be described in detail with reference to the drawings.

Figure 1:
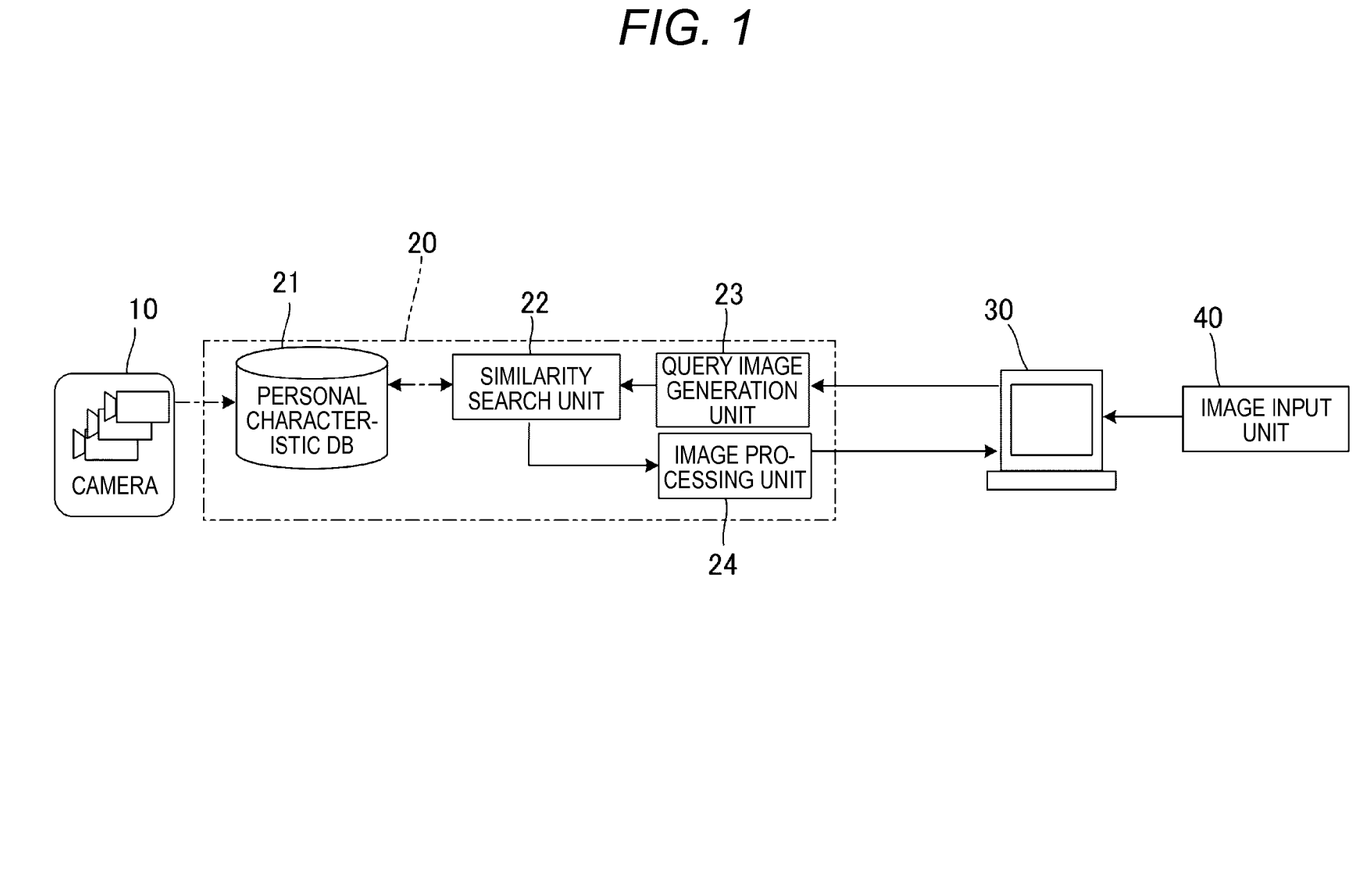
FIG. 1 is a block diagram showing the schematic structure of an image search device according to an embodiment of the present invention.

FIG. 1 is a block diagram showing the schematic structure of an image search device according to the embodiment of the present invention. In the figure, the image search device 20 of the present embodiment includes a personal characteristic database (a storage unit) 21 where characteristics of individual multiple photographic subjects obtained by shooting by multiple cameras 10 are stored in the form of a database; a similarity search unit (a similarity search unit) 22 that performs a similarity search by using a query image on the characteristics of the individual multiple photographic subjects stored in the personal characteristic database 21; a query image generation unit (a query image generation unit) 23 that generates a new query image by synthesizing, of the multiple images obtained by the similarity search unit 22, a correct image used as a criteria with another correct image or synthesizing the correct image used as the criteria with a negative-positive inverted incorrect image; and an image processing unit 24 that performs image processing for displaying the images retrieved by the similarity search unit 22 on a search terminal 30.

Figure 2:
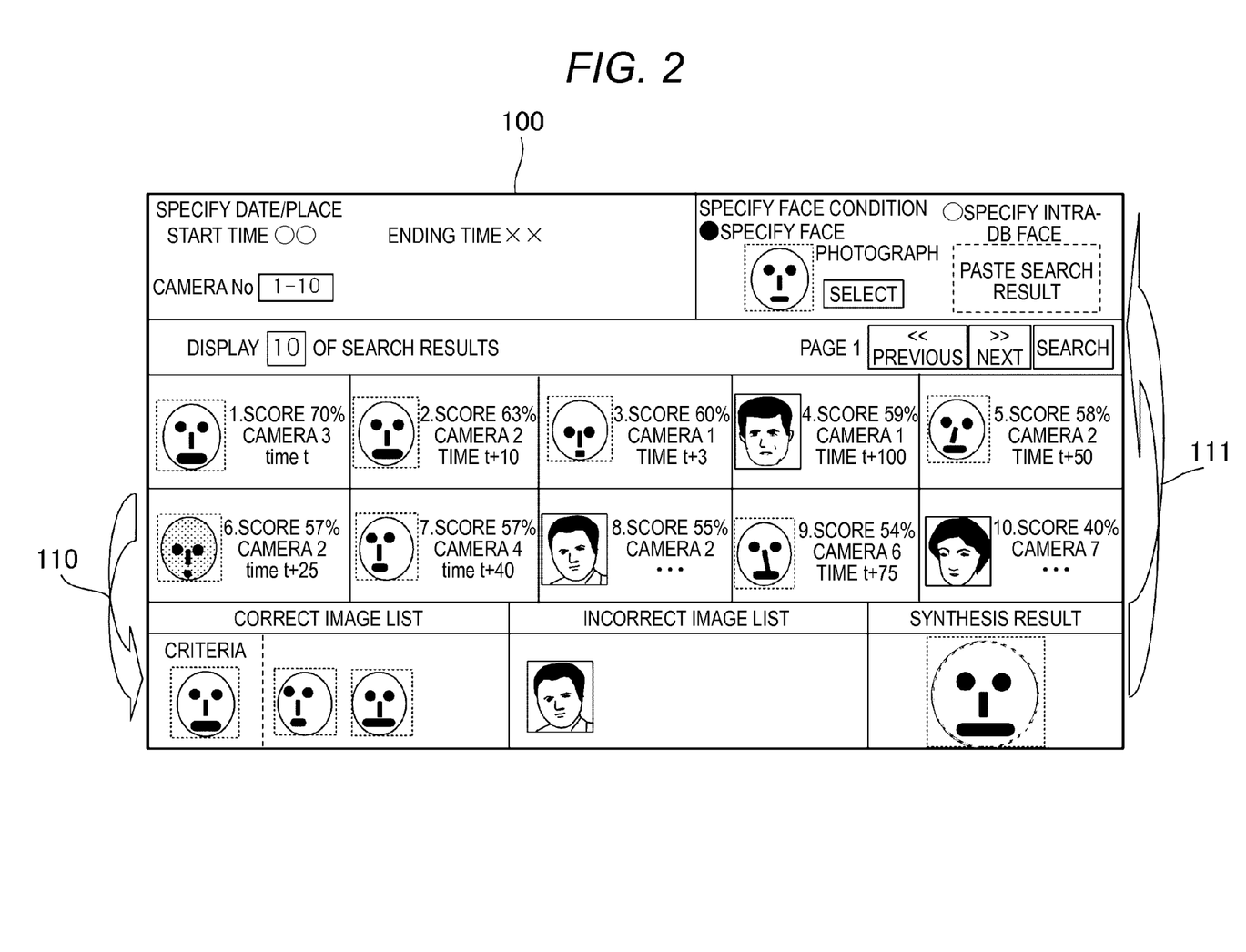
FIG. 2 is a view showing a GUI of a search terminal used for the image search device of FIG. 1.

In the first search, the similarity search unit 22 sets an image inputted from an image input unit 40 as a query image, and performs a similarity search by using this query image. In the second and subsequent searches, the similarity search unit 22 performs a similarity search by using a query image obtained by the user's specification of correct and incorrect images from the results of the first search. The images retrieved by the similarity search unit 22 are processed by the image processing unit 24 and transmitted to the search terminal 30. The image input unit 40 is, for example, a digital camera, and supplies the image search device 20 with the image used as a query image in the first search. The search terminal 30 has a monitor for displaying the images processed by the image processing unit 24 of the image search device 20 and a GUI (graphical user interface) for operating the image search device 20. Using the GUI of the search terminal 30, the user selects a correct image used as the criteria, other correct images and incorrect images in the second and subsequent image searches. FIG. 2 is a view showing the GUI 100 of the search terminal 30. Details of this GUI 100 will be described later.

Figure 3:
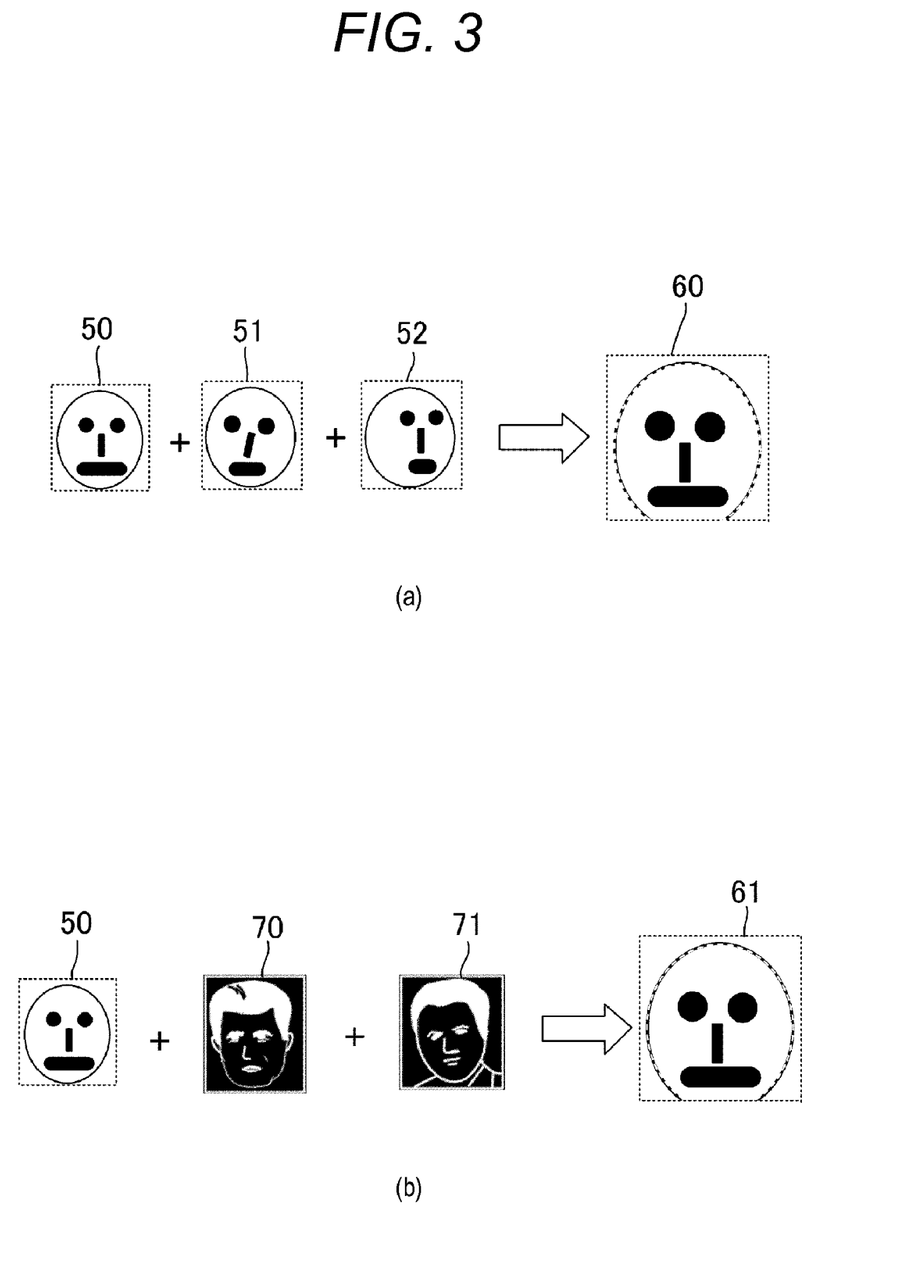
FIG. 3(a) and FIG. 3(b) are views showing an example of image synthesis in the image search device of FIG. 1.

The query image generation unit 23 generates a query image used for the second and subsequent searches by using the correct and incorrect images specified by the user from the results of the first and subsequent searches. Methods of generating a query image used for the second and subsequent searches include a method in which a correct image 50 used as the criteria is synthesized with (superposed on) other correct images 51 and 52 as shown in FIG. 3(a) and a method in which the correct image 50 used as the criteria is synthesized with (superposed on) negative-positive inverted incorrect images 70 and 71 as shown in FIG. 3(b). As the correct image used as the criteria, an image where the person is most excellently retrieved is selected.

By using the method of FIG. 3(a), a synthesized image 60 is obtained, and by using the method of FIG. 3(b), a synthesized image 61 is obtained. The method of FIG. 3(a) has the advantage of being able to generate a characteristic amount where an area unbiased by the shooting environment is enhanced and to correct the query image used for the search to the center of the person. The method of FIG. 3(b) has the advantage of being able to realize an accurate re-search where other persons are removed. The present embodiment has both of the methods of FIG. 3(a) and FIG. 3(b), and selection therebetween can be made as appropriate on the GUI 100.

Moreover, when a correct image used as the criteria is synthesized with other correct images or a correct image used as the criteria is synthesized with negative-positive inverted incorrect images in generating a query image, weighting according to the attached information regarding the photographic subject at the time of shooting is possible. The attached information regarding the photographic subject at the time of shooting includes at least one of the following pieces of information: "the orientation of the photographic subject"; "the amount of change of lighting on the photographic subject", "the resolution of the photographic subject", and "the data amount of the photographic subject". In particular, the weights assigned to the images other than the correct image used as the criteria are made rather small. For example, in FIG. 3(a), the weights are "0.8" for the correct image 50 used as the criteria, "0.1" for another correct image 51, and "0.1" for the other correct image 52.

The query image generation unit 23 generates a new query image every time a search instruction is provided from the search terminal 30 and a correct image used as the criteria and other correct images, or the correct image used as the criteria and negative-positive inverted incorrect images are supplied, and supplies the query image to the similarity search unit 22.

Figure 4:
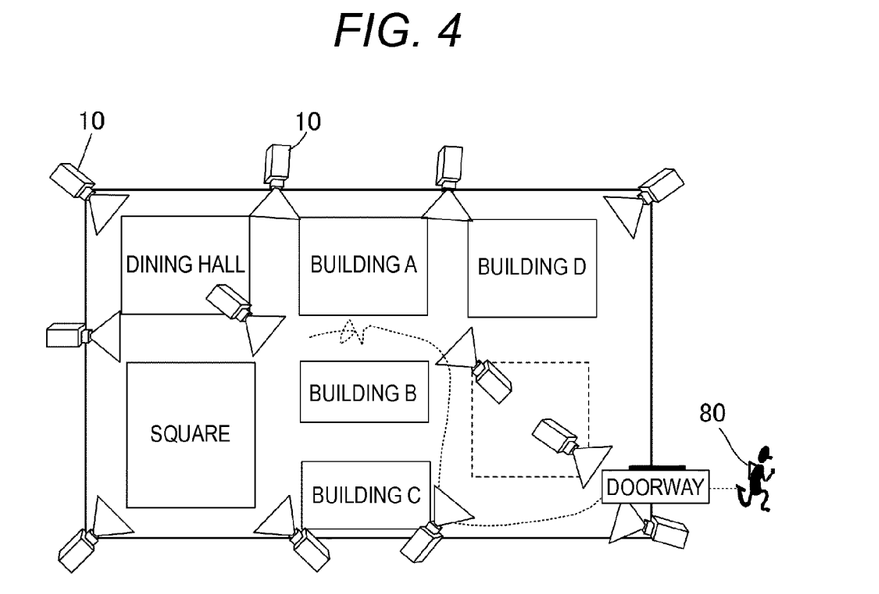
FIG. 4 is a view showing an example of use scenes of the image search device of FIG. 1.
Figure 5:
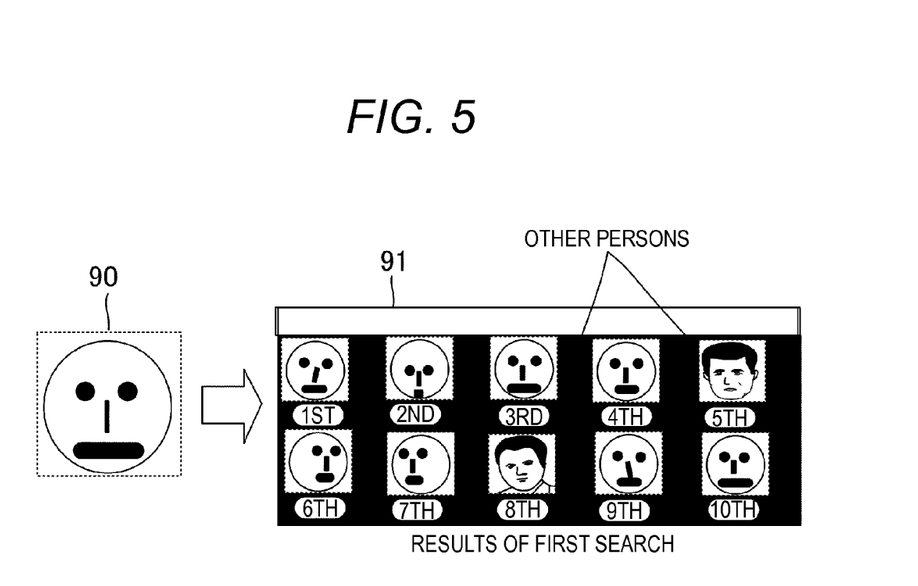
FIG. 5 is a view for explaining the first search in the image search device of FIG. 1.

Next, an example of use scenes and search operations will be described. FIG. 4 is a view showing an example of use scenes. In this figure, 12 cameras 10 are installed within an area under surveillance, and are each secured in a preset orientation. Moreover, the images of the cameras 10 are stored into the personal characteristic database 21 at all times. When a guard finds a person 80 running away within the area under surveillance, the guard searches the action history of the person 80 to check for abnormalities. In searching the action history of the person 80, first, an image taken by any of the cameras 10 is captured as the first query image, and using this query image, a similarity search on the characteristics of the photographic subjects stored in the personal characteristic database 21 is performed. FIG. 5 is a view showing an example of the results of the first search 91 using a query image 90. In these search results, two other persons are retrieved.

Figure 6:
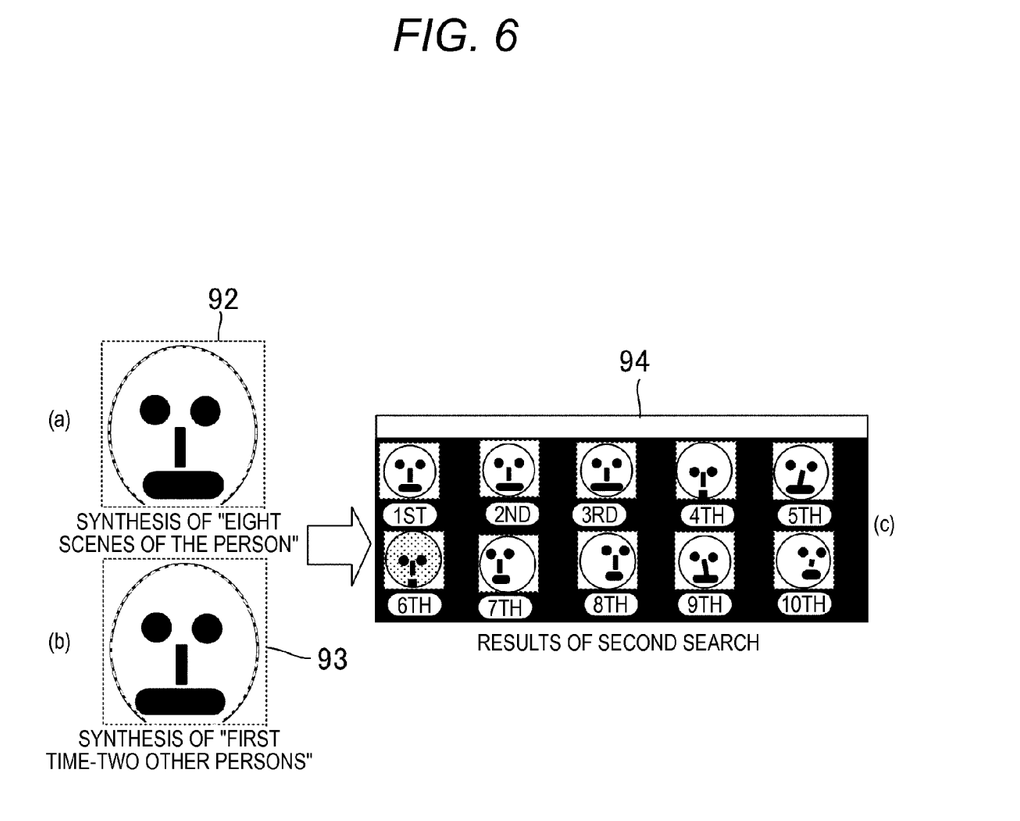

When the search results shown in FIG. 5 are obtained, a new query image is generated from these results. Then, a similarity search is performed by using the generated new query image. The new query image is generated, as described previously, from a correct image used as the criteria and other correct images, or the correct image used as the criteria and negative-positive inverted incorrect images. A query image 92 shown in FIG. 6(a) is obtained by synthesizing the correct image 90 used as the criteria with the other seven correct images in FIG. 5. Moreover, a query image 93 shown in FIG. 6(b) is obtained by synthesizing the correct image 90 used as the criteria with two negative-positive inverted incorrect images in FIG. 5. The results of the re-search using the query image 92 shown in FIG. 6(a) or the query image 93 shown in FIG. 6(b) are shown in FIG. 6 (c). As is apparent from these results of the second search 94, no incorrect image is included, and search accuracy is improved.

Figure 7:
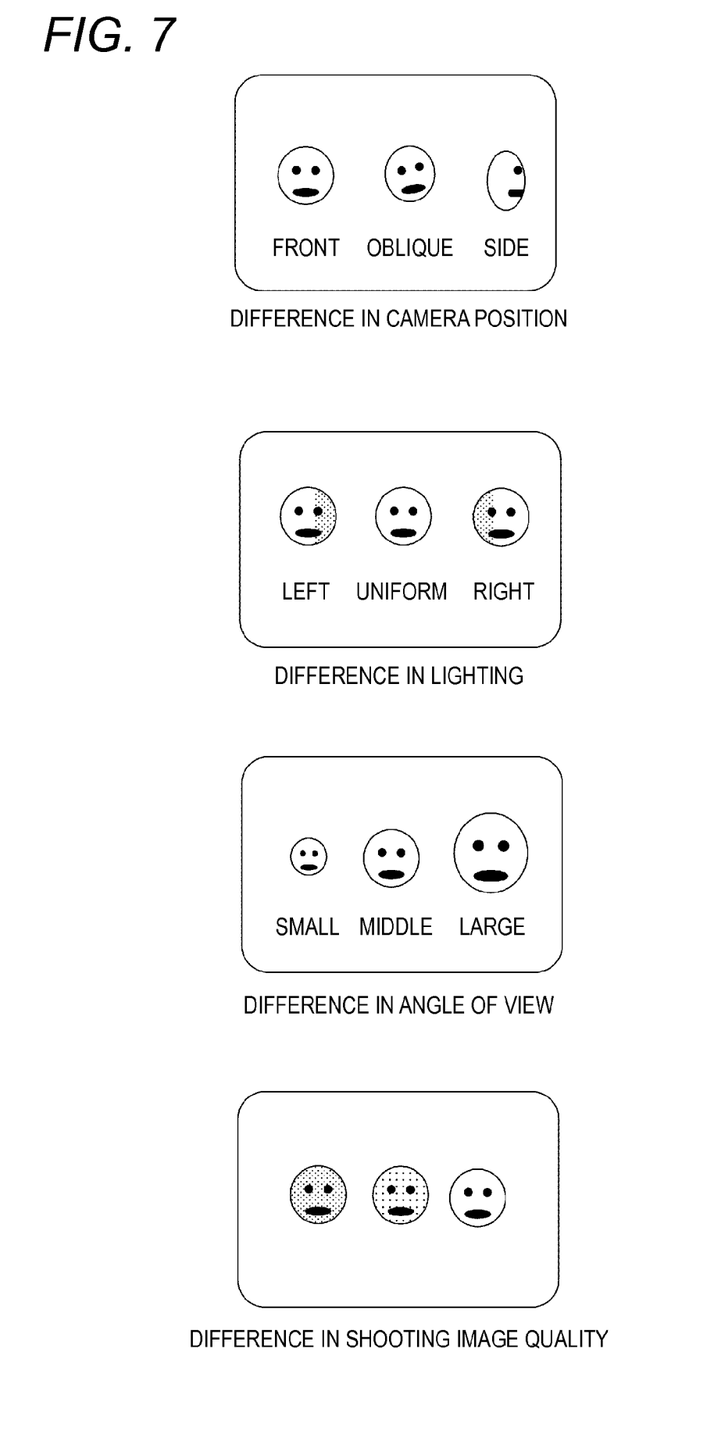
FIG. 7 is a view showing an example of images obtained as search results of the image search device of FIG. 1.

Next, details of the correct image/incorrect image synthesis method will be described. As shown in FIG. 7, the following are found in the images obtained as the search results: (1) a difference in camera position; (2) a difference in light source; (3) a difference in angle of view; and (4) a difference in shooting image quality. These differences are stored in the form of "the face orientation, the lighting change amount, the resolution, and the data amount" in the personal characteristic database 21 as the attached information used as weights.

Figure 8:
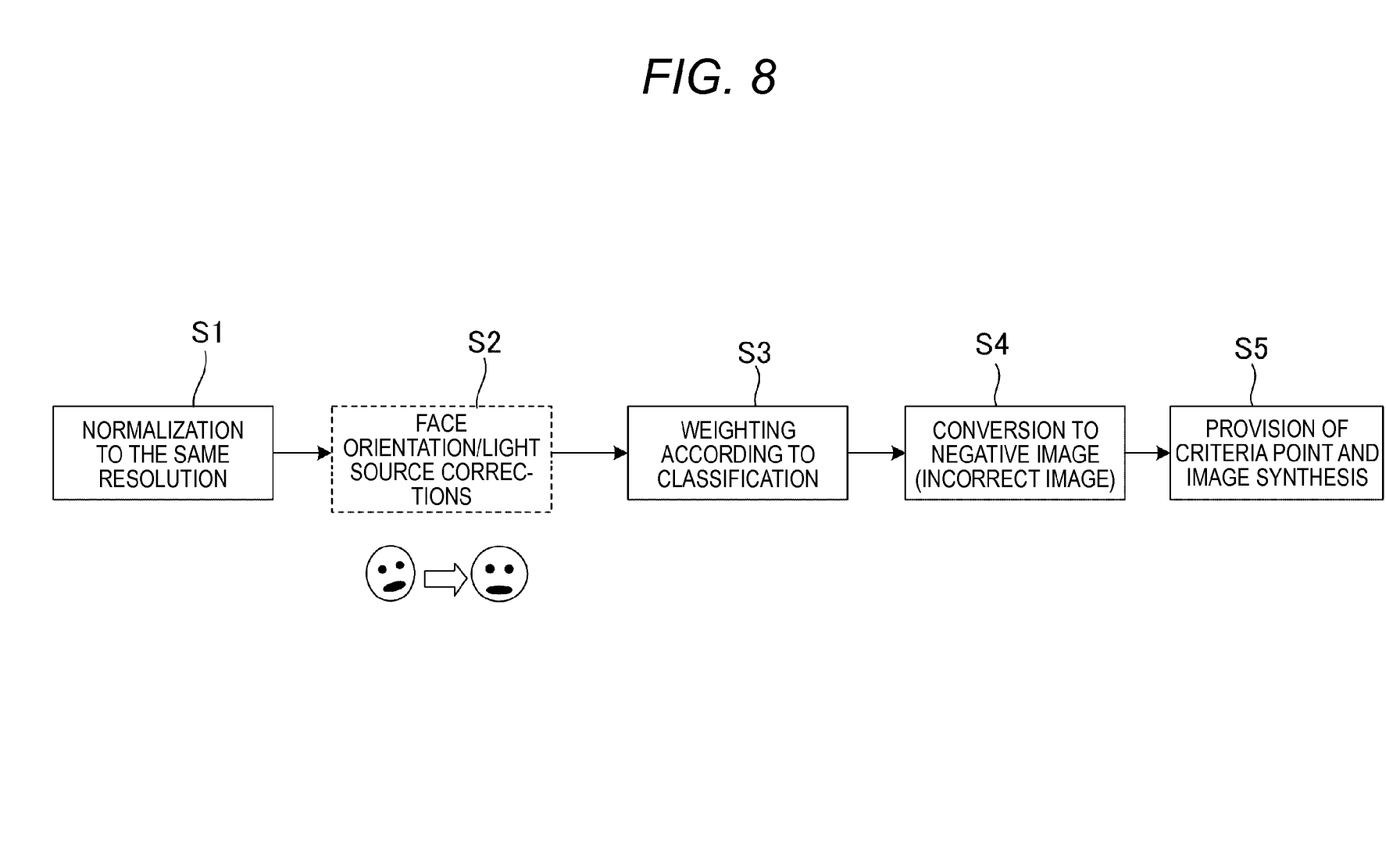
FIG. 8 is a flowchart showing an image synthesis method in the image search device of FIG. 1.

FIG. 8 is a flowchart showing the correct image/incorrect image synthesis method. In the figure, first, normalization to the same resolution is performed (step S1). That is, selected multiple images are enlarged in such a way that the resolutions thereof are the same (sizes are made the same). Then, face orientation and light source corrections are made to each image (step S2). This step is not always necessary. Then, weighting according to the classification (i.e. attached information) is performed on each image (step S3). For example, when the face is obliquely oriented, the weight is made small. Moreover, when the image quality is low, the weight is made small. The weight may be made smaller in the order of search rank.

Then, when an incorrect image is present among the selected images, the image is converted into a negative image (step S4). Then, the criteria point is provided, and the selected multiple images are synthesized (step S5). For example, the images are synthesized with the positions of both eyes being aligned.

Every time a search is performed, search results are displayed on the GUI 100 shown in FIG. 2. For example, when it is specified that ten results are displayed, ten images are displayed all at once. The user selects a correct image used as the criteria and other correct images from thereamong. Then, the user moves the selected multiple correct images to a correct image list region by a drag-and-drop operation (operation denoted by reference numeral 110). Moreover, the user also moves the incorrect images to an incorrect image list region by a drag-and-drop operation. Here, when the number of retrieved images is more than ten, the page is changed to display the next ten images, and if applicable images are present thereamong, the user selects them, and moves them to the correct image list region or to the incorrect image list region.

Then, the user selects whether to generate a synthesized image only from correct images or from images including incorrect images, and provides an instruction to generate a synthesized image. By this instruction, synthesized image generation is performed, and the result is displayed in a synthesis result region. Then, the user moves the synthesized image displayed in the synthesis result region, to an intra-DB face specification region as a new query image by a drag-and-drop operation (operation denoted by reference numeral 111). Then, a search is performed with this new query image. By repeating the above-described processing, the percentage of correct images increases, so that search efficiency improves.

Figure 9:
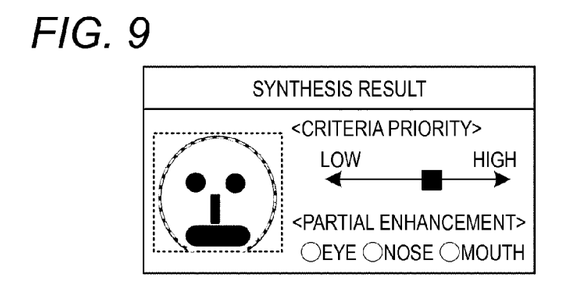
FIG. 9 is a view showing the function of the GUI for performing re-adjustment of the image synthesis results in the image search device of FIG. 1.

The GUI 100 has the function of being able to re-adjust the search results, and when an operation for this adjustment is performed, "reference priority" and "partial enhancement" are displayed in the synthesis result region as shown in FIG. 9. In the case of the reference priority, the ratio of weighting according to the classification can be changed. In this case, when the reference priority is increased, the weights assigned to the images other than the image used as the criteria are decreased; conversely, when the reference priority is decreased, the weights assigned to the images other than the image used as the criteria is increased. In the case of the partial enhancement, the pixel value or the weight of a part to be enhanced of the face (the eye, the nose, or the neighborhood of the mouth, etc.) can be increased. Moreover, the selected eye, nose or neighborhood of the mouth can be enhanced by using the reference image.

As described above, according to the image search device 20 of the present embodiment, the similarity search unit 22 performs a similarity search by using a query image on the characteristics of the photographic subjects stored in the personal characteristic database 21, and the query image generation unit 23 generates a new query image by synthesizing, of the multiple images obtained by the similarly search by the similarity search unit 22, a correct image used as the criteria with other correct images or synthesizing the correct image used as the criteria with negative-positive inverted incorrect images, and supplies this newly generated query image to the similarity search unit 22, so that by repeating this series of processing, the percentage of correct images increases and search efficiency is improved.

Moreover, since weighting according to the attached information regarding the photographic subject at the time of shooting is performed when the query image generation unit 23 synthesizes a correct image used as the criteria with other correct images or synthesizes the correct image used as the criteria with negative-positive inverted incorrect images, search efficiency is further improved.

Figure 10:
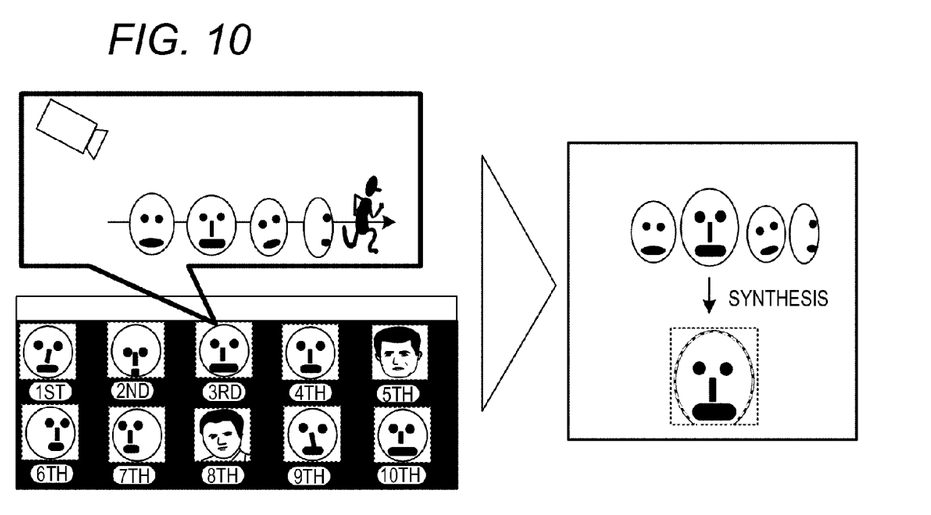
FIG. 10 is a view for explaining another image synthesis method in the image search device of FIG. 1.

While images obtained from the multiple cameras 10 are synthesized in the above-described embodiment, with attention focused on one camera, multiple images obtained from the camera may be synthesized. That is, since matching with multiple images is possible when the images are viewed as a chronological moving image, synthesis may be performed by using the images. In the example shown in FIG. 10, attention is focused on the image that is ranked third, and synthesis is performed by using this image and the previous and subsequent images. This idea is similarly applicable to a case where an appearing person is clicked on for a search during the playback of a surveillance image.

While the face is the object of search in the above-described embodiment, the color or the pattern of the clothes may be the object of search. It is preferable that the synthesis of clothes be performed, for example, with reference to the shoulders.

Moreover, while images are synthesized in the above-described embodiment, when the characteristic amounts of the eye, the nose, the mouth and the like are present in the personal characteristic database 21, synthesis may be performed using these characteristic amounts.

Figure 11:
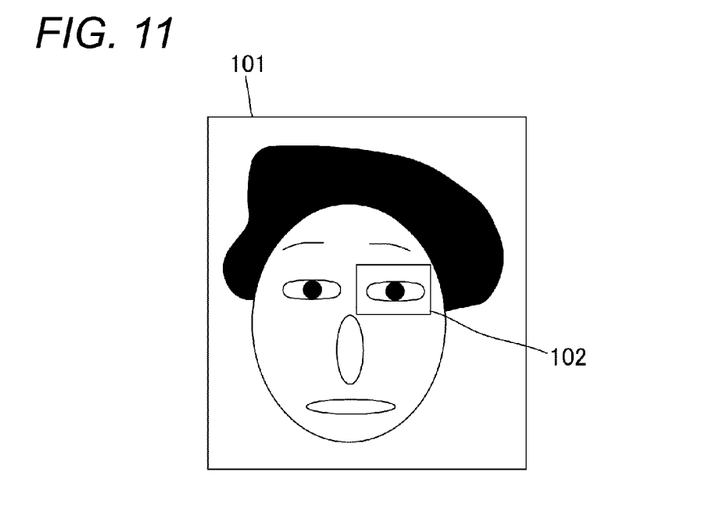
FIG. 11 is a view for explaining a method of synthesizing characteristic amounts unlike the image synthesis.

As the characteristic amount of the eye in this case, for example, when the normalized image is 101 in FIG. 11, a vector value may be used that is obtained by converting an eye region 102 representing the characteristic amount of the eye into another dimension by using wavelet conversion.

When synthesis is performed using the characteristic amounts, the correct data is obtained by adding the values of the characteristic amounts (the value of the eye, the value of the nose, and the value of the mouth, etc.) (weighting according to the classification). The incorrect data is obtained by subtracting the values of the dimensions (weighting according to the classification). In this case, by the addition being a vector addition and by performing a vector subtraction as the subtraction, a query image characteristic is generated. Moreover, weighting according to the classification is, for example, the eyes when the head faces the front and the eyes when the head faces in an oblique direction.

Moreover, the image search device 20 of the present invention is also applicable to a system that detects a suspicious individual or the like in real time from cameras installed in various environments. For example, when characteristics of a photographic subject detected by the camera 10 are registered in the personal characteristic database 21, the similarity search unit 22 performs a search with prepared face images of suspicious individuals (more than one) as query images; the image processing unit 24 determines whether or not there is a score that is equal to or higher than a certain threshold value, and determining the applicable one as a suspicious individual, activates an alarm. The contents of the alarm is a list of the "persons detected by the cameras" and "face images of suspicious individuals", and the manager (user) having received the alarm views the contents of the alarm and specifies whether the images are correct or incorrect. With reference to the prepared "face images of the suspicious individuals", the query image generation unit 23 synthesizes the images of the "persons detected by the cameras" specified as incorrect, and generates new "face images of suspicious individuals". As described above, a "real-time suspicious individual detection system" where false alarms are suppressed can be realized by correcting the prepared "face images of the suspicious individuals" according to a false alarm.

While the present invention has been described in detail with reference to a specific embodiment, it is obvious to one of ordinary skill in the art that various changes and modifications may be added without departing from the spirit and scope of the present invention.

The present application is based on Japanese Patent Application (Patent Application No. 2009-053440) filed on Mar. 6, 2009, the contents of which are incorporated herein by reference.

Industrial Applicability

The present invention has the effect of being able to improve search efficiency, and is applicable to surveillance camera systems and the like.

EXPLANATION OF REFERENCE NUMERALS 10 camera
20 image search device
21 personal characteristic database
22 similarity search unit
23 query image generation unit
24 image processing unit
30 search terminal
40 image input unit
50 correct image used as the criteria
51, 52 another correct image
60, 61 synthesized image
70, 71 negative-positive inverted incorrect image
90 correct image
91 results of the first search
92, 93 query image (synthesized image)
94 results of the second search
100 GUI

The invention claimed is:

1. An image search device comprising:
a storage unit configured to store an image of a photographic subject obtained by an imaging unit, in a form adapted to a database; and
a processor coupled to a memory, the processor configure to execute computer-executable units comprising:
 a similarity search unit that performs a similarity search on the image of the photographic subject stored in the storage unit by using a query image; and
 a query image generation unit that generates a new query image by synthesizing a correct image used as a criteria with another correct image or synthesizing the correct image used as the criteria with a negative-positive inverted incorrect image, of a result of the search by the similarly search unit,
wherein the similarity search unit performs the similarity search on the image of the photographic subject stored in the storage unit by using the new query image generated by the query image generation unit, and
wherein the correct image, the another correct image, and the negative-positive inverted incorrect image are obtained from the storage unit as the result of the similarity search performed by the similarly search unit.

2. The image search device according to claim 1, wherein the query image generation unit performs weighting according to attached information regarding the photographic subject at a time of shooting when synthesizing the correct image used as the criteria with another correct image or synthesizing the correct image used as the criteria with the negative-positive inverted incorrect image.

3. The image search device according to claim 2, wherein the attached information regarding the photographic subject at the time of shooting includes at least one piece of the following information: an orientation of the photographic subject; an amount of change of lighting on the photographic subject; a resolution of the photographic subject; and an amount of data of the photographic subject.

4. An image search device comprising:
a storage unit configured to store, in a form adapted to a database, a characteristic amount obtained by converting an image of a photographic subject obtained by an imaging unit into an image of another dimension; and
a processor coupled to a memory, the processor configure to execute computer-executable units comprising:
 a similarity search unit that performs a similarity search on the characteristic amount of the photographic subject stored in the storage unit by using a query image characteristic; and
 a query image generation unit that generates a new query image characteristic by synthesizing a characteristic amount obtained by converting a correct image used as a criteria into an image of another dimension with a characteristic amount obtained by converting another correct image into an image of another dimension, or synthesizing the characteristic amount obtained by converting the correct image used as the criteria into the image of another dimension with a characteristic amount obtained by converting a negative-positive inverted incorrect image into an image of another dimension, of a result of the search by the similarity search unit,
wherein the similarity search unit performs the similarity search on the characteristic amount of the photographic subject stored in the storage unit by using the new query image characteristic generated by the query image generation unit, and
wherein the characteristic amount obtained by converting the correct image used as the criteria into the image of another dimension, the characteristic amount obtained by converting another correct image into the image of another dimension, and the characteristic amount obtained by converting the negative-positive inverted incorrect image into the image of another dimension are obtained from the storage unit as the result of the similarity search performed by the similarly search unit.

5. The image search device according to claim 4, wherein the query image generation unit performs weighting according to attached information regarding the photographic subject at a time of shooting when synthesizing the characteristic amount obtained by converting the correct image used as the criteria into the image of another dimension with the characteristic amount obtained by converting another correct image into the image of another dimension or synthesizing the characteristic amount obtained by converting the correct image used as the criteria into the image of another dimension with the characteristic amount obtained by converting the negative-positive inverted incorrect image into the image of another dimension.

6. The image search device according to claim 5, wherein the attached information regarding the photographic subject at the time of shooting includes at least one piece of the following information: an orientation of the photographic subject; an amount of change of lighting on the photographic subject; a resolution of the photographic subject; and an amount of data of the photographic subject.

7. An image search method comprising:
a storage step of storing an image of a photographic subject obtained by an imaging unit, in a form adapted to a database;
a similarity search step of performing a similarity search on the image of the photographic subject stored at the storage step by using a query image; and
a query image generation step of generating a new query image by synthesizing a correct image used as a criteria with another correct image or synthesizing the correct image used as the criteria with a negative-positive inverted incorrect image, of a result of the search at the similarly search step,
wherein at the similarity search step, the similarity search is performed on the image of the photographic subject stored at the storage step by using the new query image generated at the query image generation step, and wherein the correct image, the another correct image, and the negative-positive inverted incorrect image are obtained as the result of the similarity search performed by the similarly search step.

8. The image search method according to claim 7, wherein at the query image generation step, weighting is performed according to attached information regarding the photographic subject at a time of shooting when the correct image used as the criteria is synthesized with another correct image or the correct image used as the criteria is synthesized with the negative-positive inverted incorrect image.

9. The image search method according to claim 8, wherein the attached information regarding the photographic subject at the time of shooting includes at least one piece of the following information: an orientation of the photographic subject; an amount of change of lighting on the photographic subject; a resolution of the photographic subject; and an amount of data of the photographic subject.

10. An image search method comprising:
a storage step of storing, in a form adapted to a database, a characteristic amount obtained by converting an image of a photographic subject obtained by an imaging unit into an image of another dimension;
a similarity search step of performing a similarity search on the characteristic amount of the photographic subject stored at the storage step by using a query image characteristic; and
a query image generation step of generating a new query image characteristic by synthesizing a characteristic amount obtained by converting a correct image used as a criteria into an image of another dimension with a characteristic amount obtained by converting another correct image into an image of another dimension, or synthesizing the characteristic amount obtained by converting the correct image used as the criteria into the image of another dimension with a characteristic amount obtained by converting a negative-positive inverted incorrect image into an image of another dimension, of a result of the search at the similarity search step, wherein at the similarity search step, the similarity search is performed on the characteristic amount of the photographic subject stored at the storage step by using the new query image characteristic generated at the query image generation step, and wherein the characteristic amount obtained by converting the correct image used as the criteria into the image of another dimension, the characteristic amount obtained by converting another correct image into the image of another dimension, and the characteristic amount obtained by converting the negative-positive inverted incorrect image into the image of another dimension are obtained as the result of the similarity search performed by the similarly search unit.

* * * * *